J. A. HEANY.
GAS ENGINE STARTING AND GENERATING APPARATUS.
APPLICATION FILED JAN. 12, 1910.

1,124,736.

Patented Jan. 12, 1915.
2 SHEETS—SHEET 1.

WITNESSES:

INVENTOR
John Allen Heany.
BY
ATTORNEY

J. A. HEANY.
GAS ENGINE STARTING AND GENERATING APPARATUS.
APPLICATION FILED JAN. 12, 1910.

1,124,736.

Patented Jan. 12, 1915.

2 SHEETS—SHEET 2.

WITNESSES:

INVENTOR
John Allen Heany.

BY
ATTORNEY

UNITED STATES PATENT OFFICE.

JOHN ALLEN HEANY, OF YORK, PENNSYLVANIA, ASSIGNOR, BY MESNE ASSIGNMENTS, TO A. E. L. LECKIE, OF WASHINGTON, DISTRICT OF COLUMBIA.

GAS-ENGINE STARTING AND GENERATING APPARATUS.

1,124,736.     Specification of Letters Patent.     Patented Jan. 12, 1915.

Application filed January 12, 1910. Serial No. 537,621.

*To all whom it may concern:*

Be it known that I, JOHN ALLEN HEANY, a citizen of the United States, and a resident of York, in the county of York and State of Pennsylvania, have invented certain new and useful Improvements in Gas-Engine Starting and Generating Apparatus, of which the following is a full, clear, and exact description, whereby any one skilled in the art may make and use the same.

The invention relates primarily to an apparatus to be used in connection with gas or liquid hydro-carbon engines or any type of engine wherein it is necessary to move certain parts of the engine to secure the initial impulse for starting the same.

It refers more particularly to a combined apparatus for starting such an engine and producing a current of electricity which may be effectively used for lighting and igniting purposes.

The object of the invention is to utilize the actuating medium for the engine for producing a source of power which may be utilized in a motor at will to actuate the main prime mover, as well as furnish the necessary ignition and lighting system in connection therewith.

A still further object is to combine in a unit, a power producing apparatus dependent for its source of energy upon the main prime mover and embodying a motor and electric generator with connections for effecting the various results of starting and producing electrical energy as above recited.

A still further object is to provide an automatic control for the mechanism.

The device is herein illustrated in connection with an automobile wherein the conditions to be satisfied are more variable, perhaps, than in any other class of mechanism.

Figure 1:
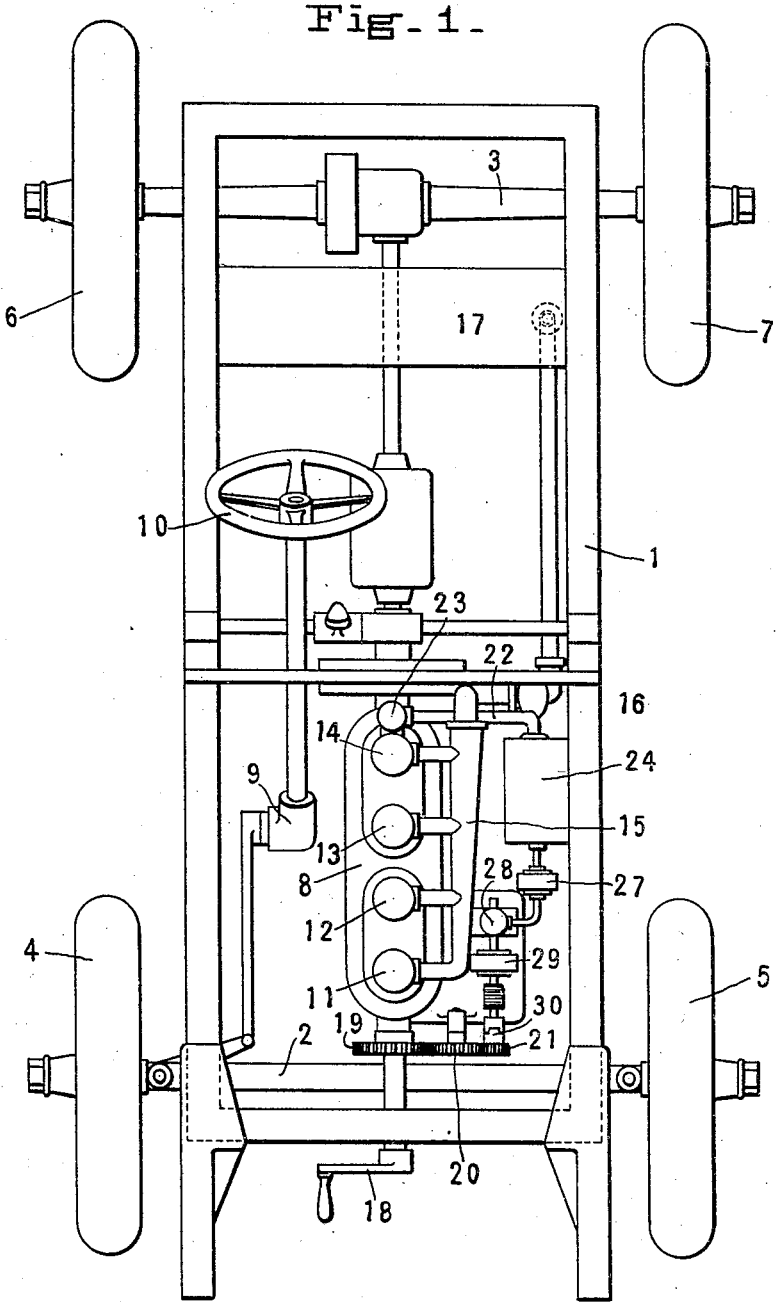
Figure 2:
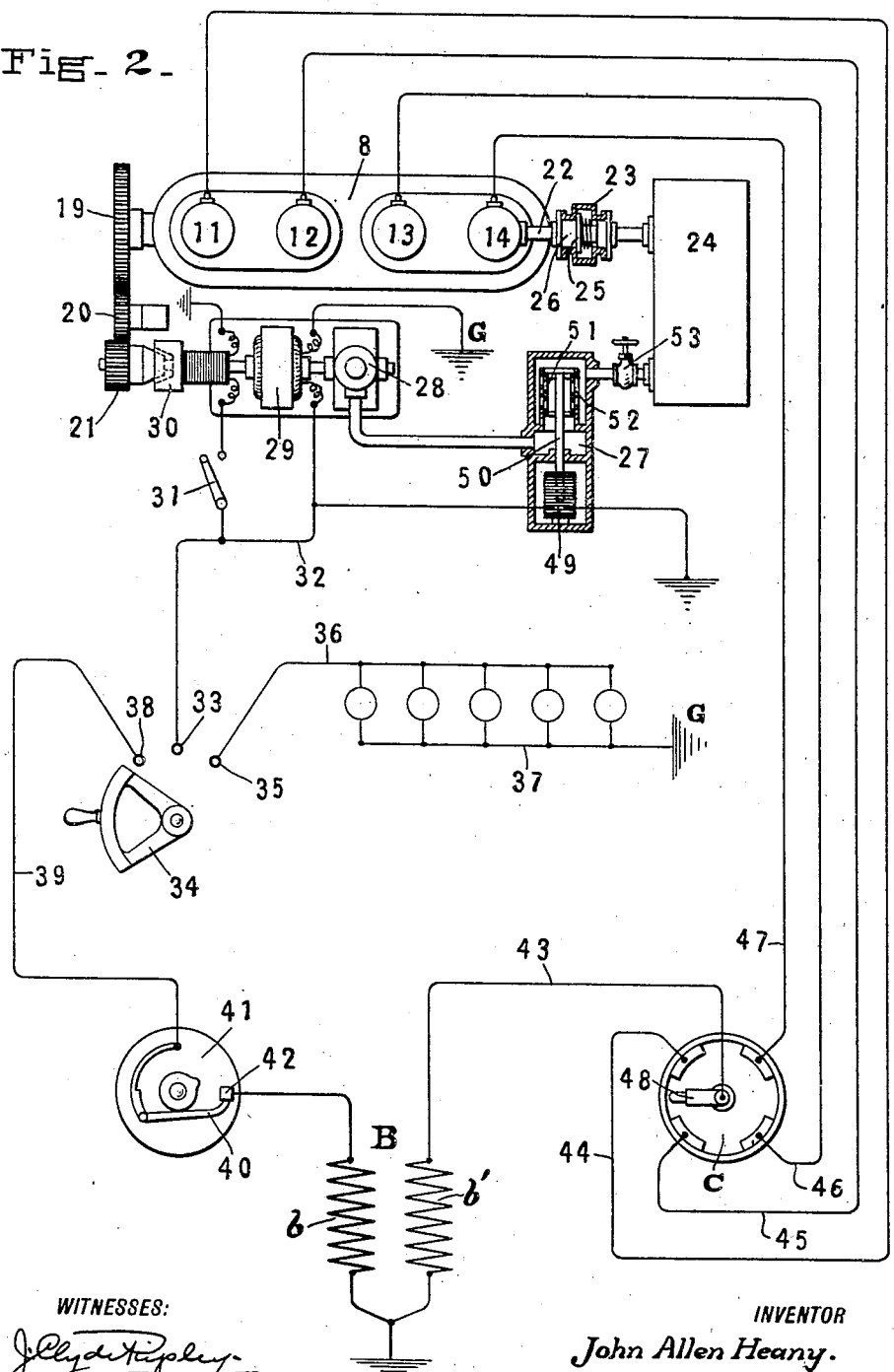

Referring to the drawings: Figure 1 is a plan view of the several parts of an automobile chassis illustrating the application of the device. Fig. 2 is a diagrammatic view illustrating the arrangements of the several parts of the structure.

While the mechanism is shown in connection with an automobile engine it is obvious that it may be utilized in connection with any prime mover which must be initially started by some source outside the main elements of the prime mover.

In the accompanying drawings, the numeral 1, denotes a chassis frame supported upon front and rear axles 2, 3, the former provided with pivoted steering wheels 4, 5, and the latter having driving wheels 6, 7. It is quite unnecessary to describe all of the various parts and connections between the engine or prime mover 8, and the rear axle 3.

The steering wheels 4, are controlled by the steering mechanism 9, through a hand-wheel 10, and it is the purpose and intention to mount the several switches controlling the mechanism hereinafter described in some convenient position with reference to the steering mechanism and the operator. The preferred location is upon the dash of the vehicle. The several switches are not shown in position, but are illustrated in the diagrammatic view in Fig. 2.

As illustrated herein, the engine 8, is of the ordinary liquid hydro-carbon type having a plurality of cylinders 11, 12, 13, 14, which receive their explosive mixture through suitable connections with a manifold 15, suitably connected with a carbureting device 16, and source of fuel supply 17.

18 indicates the starting crank of the engine such as is ordinarily applied to an automobile, and is illustrated in Fig. 1 merely to indicate a manual means for turning over the crank shaft to secure an initial impulse. Upon the crank shaft is arranged a gear 19, which, through an intermediate pinion 20, may be driven by a driving gear 21. This gear 21, is under the control of the operator as to its driving movements and is actuated by the mechanism as hereinafter described.

Connecting with one or more of the cylinder heads is a by-pass 22, which, through a check valve 23, controls the flow of fluid under pressure in said cylinder through the connection 22, to a storage receptacle 24.

The check valve 23, may be of any ordinary and well-known construction and as illustrated, a very simple form of such a device, the valve 23, is illustrated as having a spring-pressed valve 25, which, upon certain induced pressures within the valve chamber 26, will be forced backward and allow the fluid under certain pressures to pass into the storage tank 24.

The storage tank is connected with an automatic throttling device 27, which controls the passage of fluid from the tank 24, to a motor 28. This motor 28 may be of any desired type which may use compressed gas or air and is directly connected with a dynamo electric machine 29, the shaft of which bears an automatic clutch 30, adapted to clutch and unclutch the driving pinion 21.

As illustrated herein, the clutch 30, is of the electric type controlled by a switch 31, which may be conveniently arranged upon the dash of the vehicle.

The generator, as illustrated, has one of its terminals grounded as at G, to the frame of the vehicle, and a second terminal connecting through the line wire 32, with a switch contact 33, of the switch 34. A second terminal 35, of the switch, through a lead 36, provides a suitable connection for the lighting circuit, one side of which 37, is grounded in the common ground G, in the frame of the machine. Still another terminal 38, through a lead 39, connects with the movable member 40, of a make and break device 41. A stationary terminal 42, of the make and break is connected with the primary coil $b$, of a transformer B, the secondary side $b'$ thereof, connecting through a lead 43, with a distributer C. This distributer has a series of stationary contacts which are, through leads 44, 45, 46, 47, connected respectively with the insulated members of the spark plugs of the cylinders 11, 12, 13, 14. The current from the lead 43, is distributed through the several leads by a movable contact member 48.

Obviously, the make and break device and the distributing device may be of any common and well-known character adapted to receive current from the dynamo-electric machine 29.

The automatic throttling device 27, is illustrated in simple form herein as comprising a solenoid 49, which is cut into the line wire 32, and actuates a plunger 50, which moves a perforated valve member 51, within a perforated shell 52. The perforations or ports of the valve member and shell are so arranged that more or less fluid may be passed through the valve depending upon the position of the parts. The solenoid being directly cut into the generator circuit will maintain a constant speed condition for the motor 28.

To return the plunger 50 and perforated valve member 51 to its normal position, a light spring $51^a$ may be used or the weight of the parts or other mechanism may be relied upon.

It will be observed that the prime mover and generator form practically a unit for utilizing the power stored in the tank 24.

As illustrated herein, this tank 24, is connected with but a single cylinder head, although, obviously, it might be connected with several of the cylinders depending upon the storage capacity and the requirements of the motor 28. For purposes of illustration, however, it is apparent that certain pressures induced in the cylinder 14, will cause the valve 25, of the check valve 23, to open, and thereupon, a similar pressure will be induced in the storage tank 24. This tank is to be of a sufficient capacity to operate the small motor 28, for a limited period and thereby a current may be derived from the generator 29, for the lighting circuit 36, 37, even when the prime mover 8, is at rest. When it is desired to again start the prime mover 8, the switch 31, is thrown to actuate the clutch 30, and thereupon, the motor 28, will, through the pinion 21, intermediate gear 20, and gear 19, rotate the crank shaft of the engine to a sufficient degree to give an initial impulse for starting the engine 8, in operation.

To control the flow of fluid from the storage tank when the motor 28, is not in operation, any form of cut-off valve or the like, may be utilized as, for instance, the valve 53. This valve may also be arranged upon the dash or any other convenient position.

Obviously, the various details of the mechanism might be varied to suit the conditions of any particular arrangement and it is not the intention to confine the invention to the exact details which are illustrated more or less in diagrammatic form.

What I claim as my invention and desire to secure by Letters Patent is:—

1. A starting and generating apparatus comprising a prime mover under compression, means for storing energy of said prime mover, and means for delivering said stored energy to said compressed prime mover through translating devices including a motor and dynamo electric machine operatively arranged and connected therewith.

2. In a starting and generating apparatus for gas engines, a prime mover and means for storing energy of said prime mover through the medium of fluid under compression, a motor adapted to be actuated by said fluid, a dynamo electric machine connected with said motor and connections intermediate said dynamo electric machine and the main prime mover for actuating the latter.

3. In a starting and generating apparatus, a main prime mover, means for storing energy from said prime mover, a motor operatively connected with said storage means, a dynamo electric machine actuated by said motor, and electro-mechanical means for connecting said motor and main prime mover for actuating the latter.

4. In a starting and generating apparatus for gas engines, means for storing energy from the gas engine, a motor adapted to be actuated by said stored energy, a dynamo electric machine connected with said second motor, connections intermediate the motor and main prime mover for actuating and moving the latter, and ignition devices for the gas engine electrically connected with the dynamo electric machine.

5. In a starting and generating apparatus, a main prime mover, means for storing energy of said prime mover, a motor operatively connected with said storage means, said connections embodying an automatic controlling device, means for connecting said motor with the main prime mover for actuating the latter, and ignition devices for the main motor deriving energy from the prime mover.

JOHN ALLEN HEANY.

Witnesses:
I. E. SWINGLER,
FRED. B. MCLAREN.